United States Patent
Yoon (10) Patent No.: US 8,552,991 B2
(45) Date of Patent: Oct. 8, 2013

(54) PORTABLE COMPUTER

(75) Inventor: Sung-hoon Yoon, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 819 days.

(21) Appl. No.: 11/947,920

(22) Filed: Nov. 30, 2007

(65) Prior Publication Data

US 2008/0264700 A1 Oct. 30, 2008

(30) Foreign Application Priority Data

Apr. 25, 2007 (KR) .................. 10-2007-0040442

(51) Int. Cl.
*G06F 3/041* (2006.01)
*H05K 5/00* (2006.01)
*H05K 7/00* (2006.01)

(52) U.S. Cl.
USPC ..................... 345/173; 361/679.1

(58) Field of Classification Search
USPC .......... 345/173–178, 156; 361/679.26, 679.1, 361/679.18, 679.09
See application file for complete search history.

(56) References Cited

U.S. PATENT DOCUMENTS

| | | | | |
|---|---|---|---|---|
| 5,339,213 A | * | 8/1994 | O'Callaghan | 361/679.55 |
| 6,933,929 B1 | * | 8/2005 | Novak | 345/173 |
| 7,119,291 B2 | | 10/2006 | Sun | |
| 7,126,583 B1 | * | 10/2006 | Breed | 345/158 |
| 7,551,160 B2 | | 6/2009 | Lee | |
| 2004/0100449 A1 | | 5/2004 | Chuang et al. | |
| 2007/0046646 A1 | * | 3/2007 | Kwon et al. | 345/173 |

FOREIGN PATENT DOCUMENTS

| | | |
|---|---|---|
| CN | 2580527 Y | 10/2003 |
| CN | 1728053 A | 2/2006 |
| KR | 10-2006-0099741 | 9/2006 |

OTHER PUBLICATIONS

CN Office Action issued Aug. 23, 2011 in CN Patent Application No. 200810094258.7.
Chinese Office Action Issued on May 23, 2012 in CN patent Application No. 200810094258.7.
Chinese Rejection Decision dated Feb. 5, 2013 issued in CN Application No. 200810094258.7.
Korean Office Action dated Aug. 28, 2013 issued in KR Application No. 10-2007-0040442.

* cited by examiner

*Primary Examiner* — Stephen Sherman
(74) *Attorney, Agent, or Firm* — Stanzione & Kim, LLP (57) ABSTRACT

A portable computer includes a main body casing comprising an upper plate and a supporting portion disposed below the upper plate, and a touch-pad seated on the supporting portion and to sense coordinates touched on a plate surface to generate a position data of a pointer, the supporting portion comprising a lateral wall bent from the upper plate, and a seating portion bent from the lateral wall and formed with an opening in one area thereof.

25 Claims, 6 Drawing Sheets

PORTABLE COMPUTER

CROSS-REFERENCE TO RELATED APPLICATIONS

This application claims priority under 35 U.S.C. §119(a) from Korean Patent Application No. 10-2007-0040442, filed on Apr. 25, 2007 in the Korean Intellectual Property Office, the disclosure of which is incorporated herein in its entirety by reference.

BACKGROUND OF THE INVENTION

1. Field of the Invention

The present general inventive concept relates to a portable computer, and more particularly, to a portable computer having a touch-pad of a enhanced mounting configuration.

2. Description of the Related Art

In general, compactness and lightweight technologies are applied to a portable computer in consideration of mobility and convenience of use, etc., thereby enabling a user to use the portable computer in any environment. The portable computer includes a main body unit to process data and a display unit to display the data to a visualized object. Here, to designate one of the plurality of visualized objects, a cursor or a pointer is realized as an image together with the objects. In general, a mouse is applied to move the pointer in a desktop type computer which is not intended to be mobile. Alternatively, the portable computer moves the pointer according to a user's intention by a touch-pad which is mounted on a casing forming an external appearance of the main body unit.

In a conventional portable computer, the touch-pad is attached on an inside surface of the casing by using a double-sided adhesive tape, etc. Also, there is formed a stepped portion in a coupling region of the touch-pad in an upper plate surface of the casing to visually indicate a location of the touch-pad.

However, the conventional portable computer has the following problems.

First, the touch-pad should have a sensing capability to sense when the user touches the upper plate surface of the casing, because the touch-pad is coupled to the inside surface of the casing, not to the upper plate surface of the casing exposed to the outside. Accordingly, a thickness of the casing in the coupling region of the touch-pad may be less than a predetermined value. The value may be different according to the sensing capability of the touch-pad to have the general length of around 0.7 mm. However, to make one area of the casing so thin deteriorates productivity efficiency. Further, the area is susceptible to damage during use of the device.

Alternatively, if the thickness of the casing in the coupling region is increased, manufacture costs increase because the touch-pad may require relatively high sensing capability.

Second, the touch-pad is coupled to the inside surface of the casing by the double-sided adhesive tape, requiring strong adhesive strength of the double-sided adhesive tape to overcome the weight of the touch-pad. Here, it is difficult to separate the touch-pad from the casing due to the adhesive strength of the double-sided adhesive tape when the touch-pad needs to be replaced from the device. Thus, the casing is unnecessarily replaced together with the touch-pad in order to replace the touch-pad.

SUMMARY OF THE INVENTION

The present general inventive concept provides a portable computer to have a touch-pad which has a simple coupling configuration to a main body casing and is stably supported to the main body casing.

The present general inventive concept also provides a portable computer which has a touch-pad detachably coupled to a main body casing without difficulty.

The present general inventive concept also provides a portable computer which maintains airtightness of a touch-pad with respect to an outside of the device.

Additional aspects and utilities of the present general inventive concept will be set forth in part in the description which follows and, in part, will be obvious from the description, or may be learned by practice of the present general inventive concept.

The foregoing and/or other aspects and utilities of the present general inventive concept can be achieved by providing a portable computer including a main body casing including an upper plate and a supporting portion disposed below the upper plate, and a touch-pad seated on the supporting portion and to sense coordinates touched on a plate surface to generate position data of a pointer, the supporting portion including a lateral wall bent from the upper plate, and a seating portion bent from the lateral wall and formed with an opening in one area thereof.

The portable computer may further include a cover pad disposed on the touch-pad in the supporting portion.

The cover pad may include an insulating material.

The portable computer may further include a first coupling member to couple the seating portion and the touch-pad.

The first coupling member may include a double-sided adhesive tape.

The portable computer may further include a second coupling member to couple the touch-pad and the cover pad.

The second coupling member may include a double-sided adhesive tape.

The portable computer may further include a connecting member connected to the touch-pad and to transmit the position data of the pointer generated in the touch-pad, wherein the connecting member passes through the opening.

The supporting part may further include a first supporting portion disposed below the upper plate and on which the cover pad is seated, a second supporting unit disposed below the first supporting portion and on which the touch-pad is seated.

The first supporting part may include a first lateral wall bent from the upper plate and a first seating portion bent from the first lateral wall, and the second supporting portion may include a second lateral wall bent from the first seating portion and a second seating portion which is bent from the second lateral wall and formed with the opening in one area thereof.

The portable computer may further include a first coupling member to couple the second seating portion and the touch-pad.

The first coupling member may include a double-sided adhesive tape.

The portable computer may further include a second coupling member to couple the first seating portion and the cover pad.

The second coupling member may include a double-sided adhesive tape.

The portable computer may further include a connecting member connected to the touch-pad and to transmit the position data of the pointer generated in the touch-pad, wherein the connecting member passes through the opening.

The foregoing and/or other aspects and utilities of the general inventive concept may also be achieved by providing a computer, comprising a touch-pad assembly to sense coordinates touched on a plate surface, and a main body casing including an upper plate having a supporting portion formed therein, the supporting portion having an opening in a plane along an upper surface of the upper plate and a recessed area to receive and to support the touch plate assembly, wherein the opening allows the touch-pad assembly to be received by and removed from the recessed area of the supporting portion.

The foregoing and/or other aspects and utilities of the general inventive concept may also be achieved by providing a computer, comprising a touch-pad assembly to sense coordinates touched on a plate surface, and a main body casing including an upper plate having a supporting portion formed therein, the supporting portion having an opening in a plane along an upper surface of the upper plate and a recessed area to support the touch plate assembly, wherein a width of the touch-pad assembly is less than a width of the opening of the supporting portion.

The foregoing and/or other aspects and utilities of the general inventive concept may also be achieved by providing a method of coupling a touch-pad assembly to a computer, the method comprising coupling one side of a first coupling member to a seating portion disposed below an upper panel of a computer, coupling one side of a touch-pad to an other side of the first coupling member, coupling an other side of the touch-pad to one side of a second coupling member; and coupling an other side of the second coupling member to a cover pad.

BRIEF DESCRIPTION OF THE DRAWINGS

These and/or other aspects and utilities of the present general inventive concept will become apparent and more readily appreciated from the following description of the embodiments, taken in conjunction with the accompanying drawings, in which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
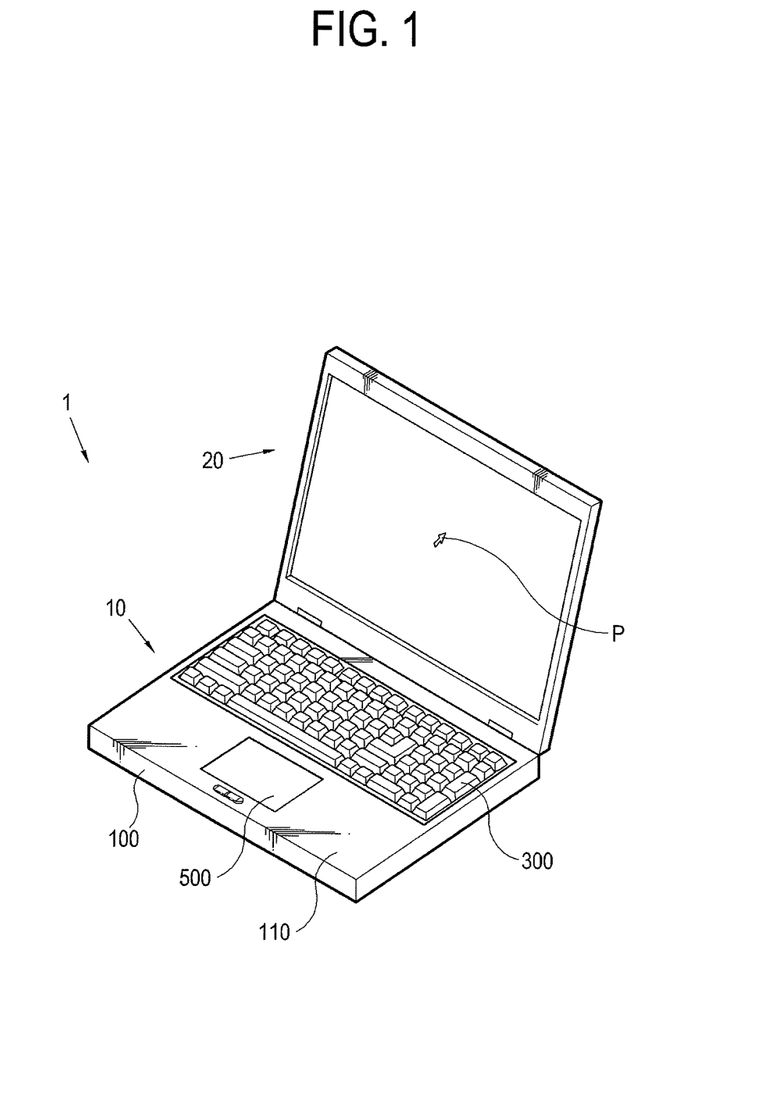
FIG. 1 is a perspective view illustrating a portable computer according to an exemplary embodiment of the present general inventive concept.

As illustrated in FIG. 1, a portable computer 1 according to an exemplary embodiment of the present general inventive concept includes a main body unit 10 to process and to store data, and a display unit 20 which is rotatably coupled to the main body unit 10, to receive image information processed in the main body unit 10, to display the image information, and to visually realize a pointer P.

Figure 2:
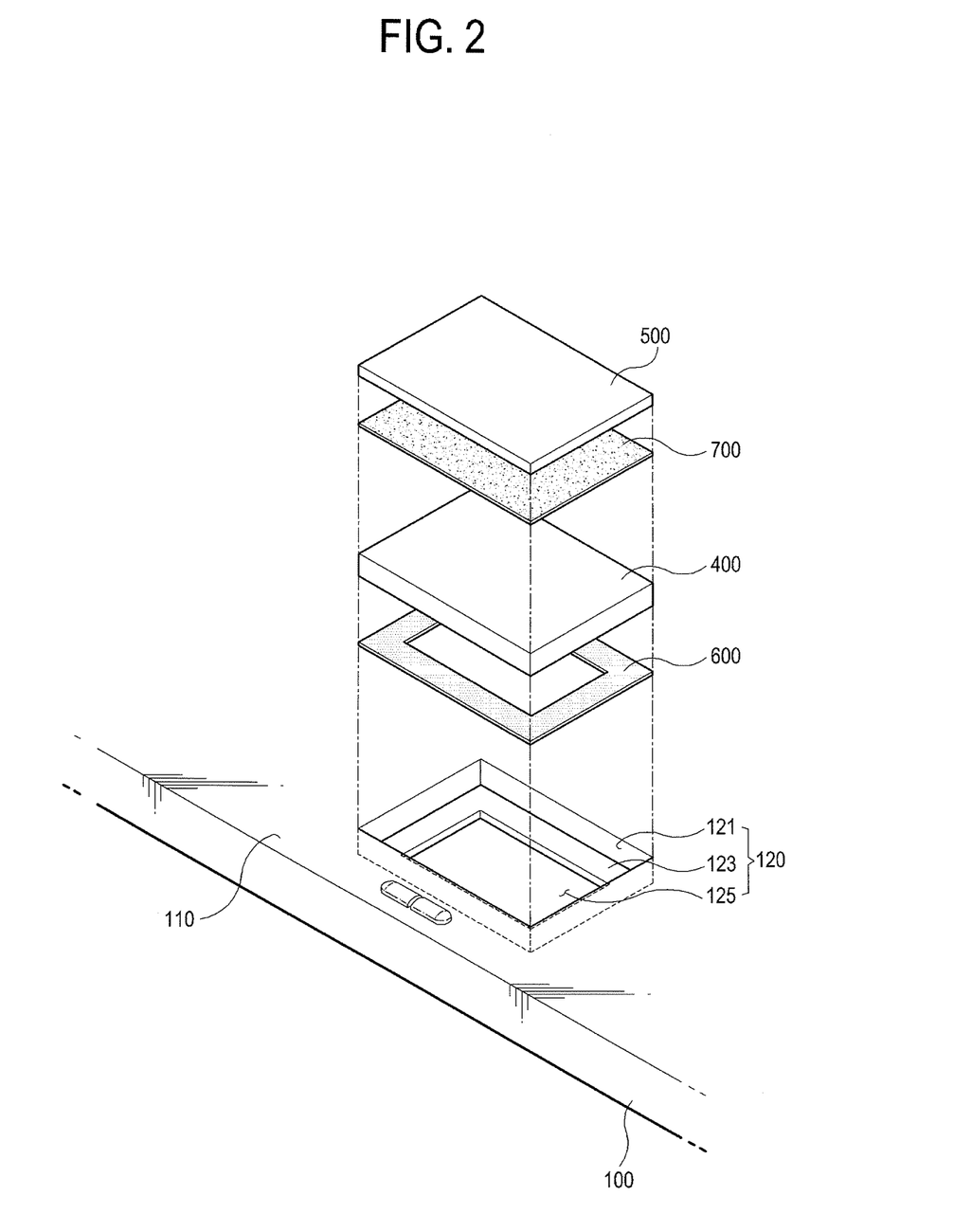
FIG. 2 is an exploded perspective view illustrating a separate state of a touch-pad in the portable computer of FIG. 1.

Referring to FIGS. 1 and 2, the main body unit 10 includes a main body casing 100, a keyboard unit 300 provided in an external portion of the main body casing 100, a touch-pad 400 mounted on the main body casing 100 to move the pointer P, a cover pad 500 disposed on the touch-pad 400, a first coupling member 600 to couple the touch-pad 400 to the main body casing 100, and a second coupling member 700 to couple the touch-pad 400 and the cover pad 500. (refer to FIGS. 1 and 2)

The main body casing 100 forms an external appearance of the main body unit 10, and has a space to receive and to support sub-components forming the main body unit 10 therein. The main body casing 100 has a rectangular plate shape having a predetermined thickness, and includes a lightweight and rigid material such as a plastic, etc., to enhance the mobility of the personal computer 1. The display unit 20 rotatably couples one side of the main body casing 100.

When the main body casing 100 is supported on an installation surface of a desk, etc., a bottom surface of the main body casing 100 is in contact with the installation surface. An upper plate 110 is upwardly opened in an opposite direction with respect to the bottom surface of the main body casing 100. Also, the main body casing 100 includes a supporting portion 120 (FIG. 2) to accommodate and to support the touch-pad 400 in one portion of the upper plate 110.

The upper plate 110 is an external area of the main body casing 100, which is covered by the plate surface of the display unit 20 when the display unit 20 rotates to cover the main body unit 10. A user input device such as the keyboard unit 300, the touch-pad 400, etc., is disposed on the upper plate 110 so that the user can access the upper plate 110 without difficulty from external areas of the main body casing 100, when the portable computer 1 is supported on the installation surface and the display unit 20 is opened with respect to the main body unit 10.

The keyboard unit 300 is disposed on one portion of the upper plate 110, and the touch-pad 400 is disposed to be spaced apart from the keyboard unit 300. The supporting portion 120 is provided in another portion of the upper plate 110, so that the touch-pad 400 couples the main body casing 100.

Referring to FIGS. 1 and 2, the supporting portion 120 is disposed below the upper plate 110, and accommodates and supports the touch-pad 400. The position of the supporting portion 120 provided in the upper plate 110 is not limited, and may be variously designed. For example, when the display unit 20, which is rotated from the main body unit 10 and opened, faces a user, the supporting portion 120 is provided in a location distanced from the keyboard unit 300 toward the user in the upper plate 110 so that the user can readily access the touch-pad 400 supported in the supporting portion 120. Alternatively, the supporting portion 120 can be disposed between the keyboard unit 300 and the display unit 20 to prevent a user's hand from unintentionally contacting the touch-pad 400 and moving the pointer P when the user handles the keyboard unit 300.

Figure 3:
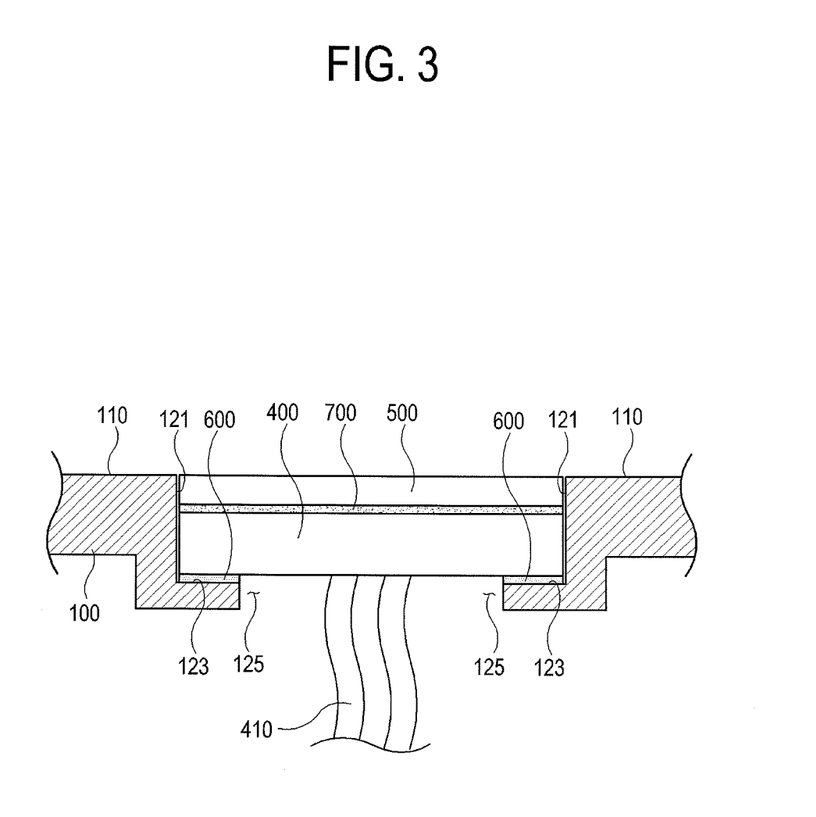
FIG. 3 is an assembled sectional view illustrating a touch-pad in the portable computer of FIG. 2.

Referring to FIGS. 2 and 3, the supporting portion 120 includes a lateral wall 121 disposed between the upper plate 110 and a seating portion 123, and an opening 125 formed in a center region of the seating portion 123. An upper portion of the lateral wall 121 bends downwardly from the upper plate 110, an inner portion of the seating portion 123 bends from the lateral wall 121 toward the opening 125 formed in a center region of the seating portion 123. A bent angle between the upper plate 110 and the lateral wall 121 and a bent angle between the lateral wall 121 and the seating portion 123 are not limited, but the angles may be perpendicular to each other in consideration that the shape of the touch-pad 400 and the cover pad 500 is a rectangular plate. That is, each bent angle corresponds to the shape of the touch-pad 400 and the cover pad 500 supported to the supporting portion 120. The exemplary embodiment of the present general inventive concept as illustrated in FIGS. 1 and 2 illustrates the shapes of the touch-pad 400 and the cover pad 500 to be rectangular plate shapes, but the concept of the present general inventive concept is not limited thereto.

The lateral wall 121 bends from the upper plate 110 in a perpendicular direction thereto and extends toward an inside of the main body casing 100. The lateral wall 121 supports a side portion of the touch-pad 400 so that the touch-pad 400 cannot move in parallel with the upper plate 110. Here, the supporting portion 120 that supports the single touch-pad 400 corresponds to a shape and a size of the touch-pad 400 having a rectangular plate shape, and includes two pairs of the lateral walls 121 in which each of the lateral walls 121 of a respective pair face each other. A distance between the respective lateral walls 121 for each pair facing each other is not less than a width of the touch-pad 400 supported on the supporting portion 120.

The seating portion 123 bends from the lower portion of the lateral wall 121 in the direction towards the opening 125. In the exemplary embodiment as illustrated in FIGS. 1-3, the seating portion 123 extends from each of the lateral walls 121 included in one supporting portion 120 toward a corresponding lateral wall 121 facing opposite therefrom. Accordingly, the seating portion 123 supports a lower edge area of the touch-pad 400. In another exemplary embodiment, the seating portion 123 can extend from any number of the lateral walls 121.

The opening 125 passes through the supporting portion 120 to be adjacent to the seating portion 123. The opening 125 exposes a central area of the bottom plate surface of the touch-pad 400 supported on the supporting portion 120 to the inside of the main body casing 100. Accordingly, a connecting member 410 (FIG. 3) electrically connects the touch-pad 410 and a main board portion (not illustrated) in the main body casing 100 so that the position data of the pointer P created in the touch-pad 400 can be transmitted to the main board portion (not illustrated).

As illustrated in FIG. 3, the touch-pad 400 sits on and is supported by the supporting portion 120, generates the position data of the pointer P, and has a connecting member 410 to transmit the position data to a predetermined device such as the main board portion (not illustrated), etc. The connecting member 410 passes through the opening 125 from the bottom surface of the touch-pad 400, and is extended to the main board portion (not illustrated).

The cover pad 500 is provided on the touch-pad 400 in the supporting portion 120. The cover pad 500 covers the upper plate surface of the touch-pad 400 to prevent the touch-pad 400 from abrasion by a touch of the user and a collision by an external object. The cover pad 500 includes an insulating plastic material. By this, the touch-pad 400 precisely recognizes the touched coordinates in the touch-pad 400 in the lower portion of the touched cover pad 500 when the user touches the plate surface of the cover pad 500.

The thickness of the cover pad 500 is not limited and may be varied. There are various factors to determine the thickness of the cover pad 500. For example, the factors can be whether the thickness of the cover pad 500 is thin at some portion, a protective function for the touch-pad 400 is deteriorated or the touch-pad 400 may be easily damaged. Alternatively, if the thickness of the cover pad 500 is thick at some portion, a high sensing capability may be demanded because the touch-pad 400 is required to recognize the touched coordinates when the user touches the touch-pad 400. Accordingly, the cost of the touch-pad 400 is increased.

The cover pad 500 may have a different color from that of the upper plate 110 or may be applied with various patterns by surface treatment on the plate surface of the cover pad 500 so as to enhance the external appearance and enable the user to recognize the position of the touch-pad 400.

Referring to FIG. 3, the first coupling member 600 couples the seating portion 123 and the bottom plate surface of the touch-pad 400. The first coupling member 600 may have various configurations to achieve its purpose. The double-sided adhesive tape may be included in the first coupling member 600 to simplify the configuration and reduce manufacturing costs. The first coupling member 600 is interposed between the seating portion 123 and the touch-pad 400, and is adhered to both components, thereby coupling the seating portion 123 and the touch-pad 400. Here, the weight of the touch-pad 400 is supported by the seating portion 123, so that the adhesive strength of the first coupling member 600 is not overcome by the weight of the touch-pad 400. Accordingly, the adhesive strength of the first coupling member 600 is adjusted to the optimum level so that the touch-pad 400 can be replaced from the supporting portion 120 without difficulty.

The first coupling member 600 may be provided in an entire area or in some area in which the seating portion 123 and the touch-pad 400 contact each other. However, the first coupling member 600 is provided in the entire area where the seating portion 123 and the touch-pad 400 contact each other to maintain the airtightness of the inside of the main body casing 100 against the outside of the upper plate 110. For example, if the user spills liquid such as coffee, etc., over the upper plate 110, the first coupling member 600 prevents the liquid from flowing into the main body casing 100 through the supporting portion 120 and damaging various circuit portions (not illustrated) provided in the main body casing 100.

The second coupling member 700 couples the touch-pad 400 and the cover pad 500. The second coupling member 700 may include the double-sided adhesive tape for the same reason as the first coupling member 600. The second coupling member 700 is interposed between the touch-pad 400 and the cover pad 500. The second coupling member 700 is composed of a material and has a predetermined thickness so that the touch-pad 400 can sense the touch of the upper plate 110 without interference when the user touches the upper plate surface of the cover-pad 400.

The second coupling member 700 may be interposed in the entire area or in some area between the touch-pad 400 and the cover pad 500. However, because the second coupling member 700 has a predetermined thickness, the second coupling member 700 may be interposed in the entire area between the touch-pad 400 and the cover pad 500 to allow accurate recognition of the coordinates of the touch-pad 400 and comfortable use.

Figure 6:
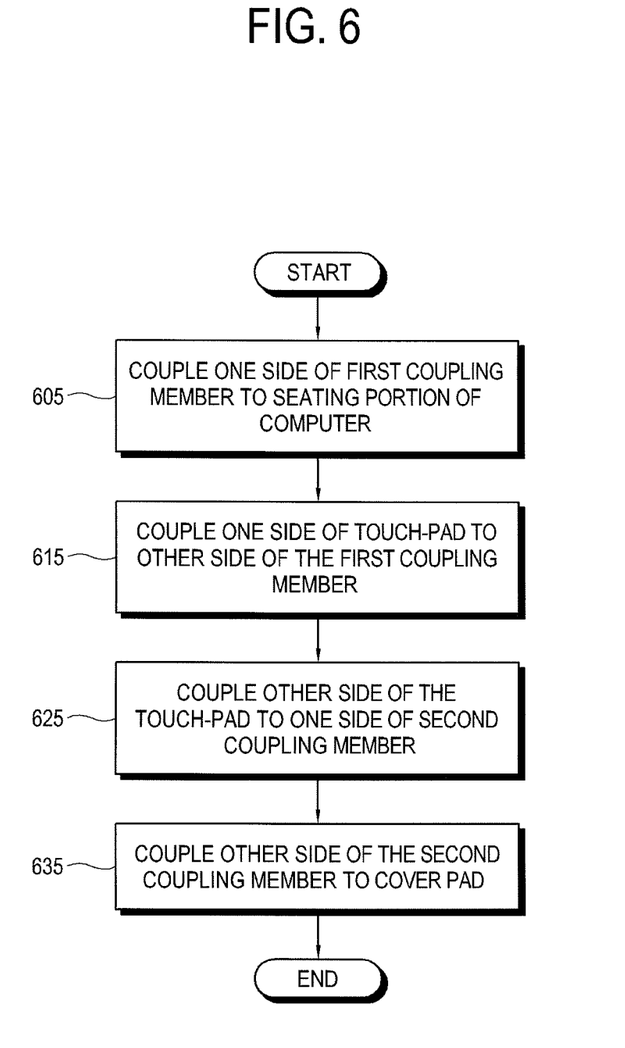
FIG. 6 is a flowchart illustrating another exemplary embodiment of installing a touch-pad assembly to the portable computer of FIG. 2.

A process coupling a touch-pad assembly 601 (FIG. 4) including the touch-pad 400, one or more coupling members 800 and 900, and the cover pad 500 to the main body casing 100 in the portable computer 1 according to the exemplary embodiment of the present general inventive concept as illustrated in FIGS. 1-3 will be described with reference to FIGS. 2-3 and 6. FIG. 6 is a flowchart illustrating an exemplary embodiment of installing the touch-pad assembly 610 to the portable computer 1.

If the main body casing 100 is supported on a predetermined installation surface, the upper plate 110 and the supporting portion 120 are placed upwardly. One side surface of the first coupling member 600 adheres to the seating portion 123 (operation 605).

The touch-pad 400 sits on the seating portion 123 with the area to which the connecting member 410 connects facing downward. In this case, the connecting member 410 passes through the opening 125 and extends to the inside of the main body casing 100.

A lower edge area of the touch-pad 400 adheres to an upper surface of the first coupling member 600 having a lower surface that adheres to the seating portion 123 (operation 615). Accordingly, the seating portion 123 and the touch-pad 400 are coupled by the first coupling member 600.

A lower surface of the second coupling member 700 adheres to the upper plate surface of the touch-pad 400 (operation 625), and then the cover pad 500 sits on an upper surface of the second coupling member 700 that adheres to the upper plate surface of the touch-pad 400. The cover pad 500 and the touch-pad 400 are coupled by the second coupling member 700 (operation 635).

Accordingly, the weight of the touch-pad 400 is supported by the lateral wall 121 and the seating portion 123 and is coupled to the seating portion 123 by the first coupling member 600. Also, the touch-pad 400 is covered by the cover pad 500, thereby preventing abrasion of the touch-pad 400 and ensuring airtightness.

The touch-pad assembly 601 can be removed from the main body casing 100 of the portable computer 1 by reversing the operations described above with reference to FIG. 6.

Figure 4:
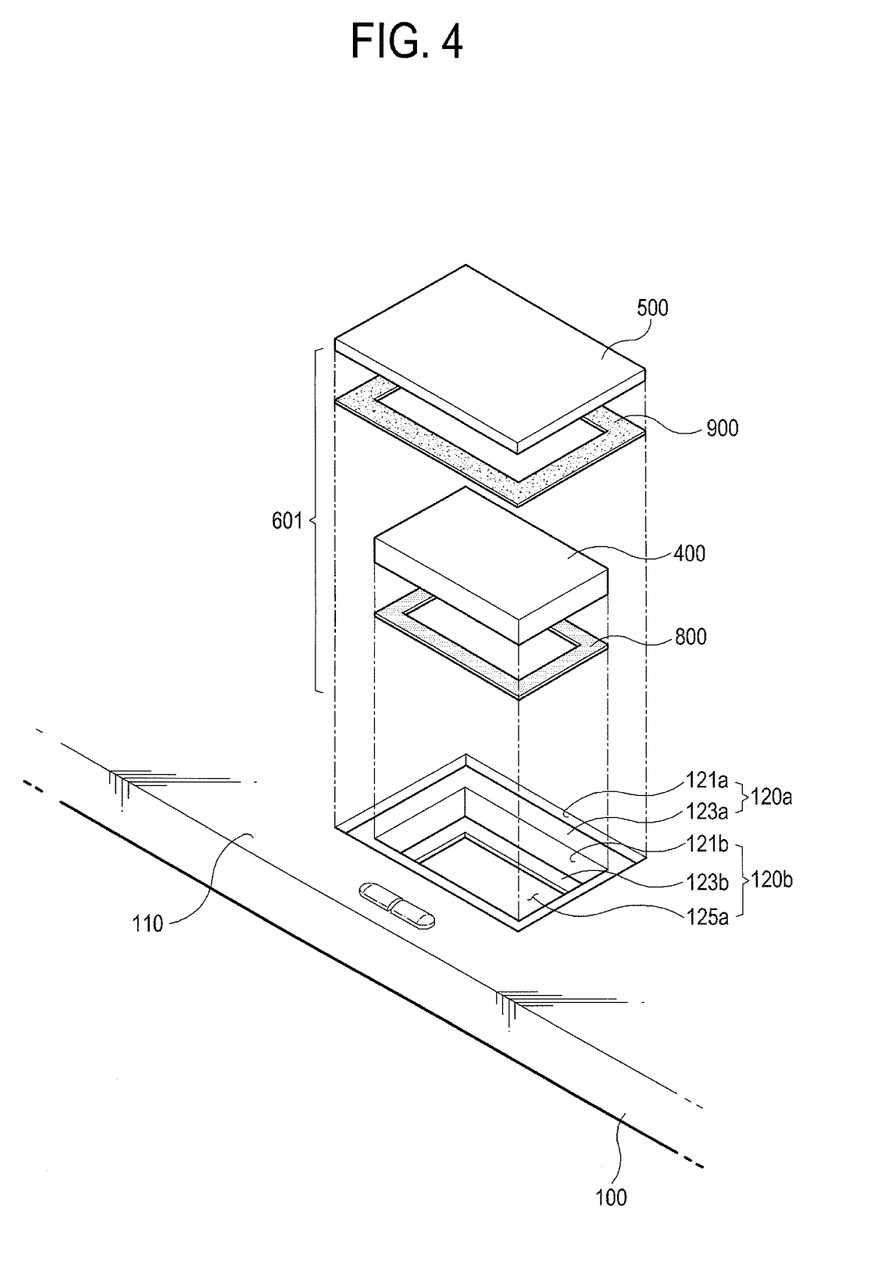
FIG. 4 is an exploded perspective view illustrating a separate state of a touch-pad in the portable computer according to another exemplary embodiment of the present general inventive concept.

Meanwhile, in the exemplary embodiment of the present general inventive concept as illustrated in FIGS. 1 and 2, regions between the lateral wall 121 and the cover pad 500, and between the lateral wall 121 and the touch-pad 400 are not coupled. Thus, if the liquid, etc., is introduced to the above region, the liquid is prevented from flowing to the inside of the main body casing 100, but the liquid may arrive in the touch-pad 400. Accordingly, an exemplary embodiment as illustrated in FIG. 4 and having the configuration will be described. The description related to the elements having the same structure and function as illustrated in the exemplary embodiment as illustrated in FIGS. 1 and 2 will be omitted.

As illustrated in FIG. 4, the portable computer 1 according to the exemplary embodiment of the present general inventive concept as illustrated in FIG. 4 includes a first supporting portion 120a disposed below the upper plate 110 and receiving the cover pad 500, a second supporting portion 120b disposed below the first supporting portion 120a, a first coupling member 800 coupling the second supporting portion 120b and the touch-pad 400, and a second coupling member 900 coupling the first supporting portion 120a and the cover pad 500. Here, the cover pad 500 mounted on the first supporting portion 120a has a wide front and back widths and a wide left and right widths compared with the touch-pad 400 mounted on the second supporting portion 120b.

The first supporting portion 120a has a first lateral wall 121a bent from the upper plate 110 downwardly and a first seating portion 123a bent from the first lateral wall 121a towards an opening 125a.

The first lateral wall 121a is bent toward an inside of the main body casing 100 in a perpendicular direction to the upper plate 110.

The first seating portion 123a is bent from a lower portion of the first lateral wall 121a having an upper portion that extends from the upper plate 110. The first seating portion 123a extends in a parallel direction with the upper plate 110 and supports the lower edge area of the cover pad 500.

The second supporting portion 120b includes an upper portion of a second lateral wall 121b bent from the first seating portion 123a, a lower portion of a second seating portion 123b bent from the second lateral wall 121b toward the opening 125a, and the opening 125a which passes through the central area of the second seating portion 123b.

The second lateral wall 121b bends from an outer portion of the first seating portion 123a having an inner portion that extends from the outer portion of the first lateral wall 121a. The second lateral wall 121b supports the side portion of the touch-pad 400.

The second seating portion 123b bends from a lower portion of the second lateral wall 121b having an upper portion that extends from the outer portion of the first seating portion 123a. The second seating portion 123b has a plate surface in parallel with the upper plate 110 and the first seating portion 123a, and supports the bottom portion of the touch-pad 400.

The opening portion 125a passes through one area of the second seating portion 123b such as the central area of the second seating portion 123b. The opening 125a exposes the central area of the bottom plate surface of the touch-pad 400 supported on the second supporting portion 120b to the inside of the main body casing 100. The connecting member 410 (FIG. 5) extends to the inside of the main body casing 100 through the opening 125a.

The first coupling member 800 couples the second seating portion 123b and the touch-pad 400. The first coupling member 800 may have various configurations, but the double-sided adhesive tape may be included in the first coupling member 800 to simplify the configuration, reduce manufacturing costs and improve airtightness. The first coupling member 800 is interposed between the second seating portion 123b and the touch-pad 400 adheres to the second seating portion 123b so that the touch-pad 400 does not separate from the main body casing 100.

The second coupling member 900 couples the first seating portion 123a and the cover pad 500. The second coupling member 900 includes the double-sided adhesive tape, to thereby simplify the configuration and increase the airtightness.

Figure 5:
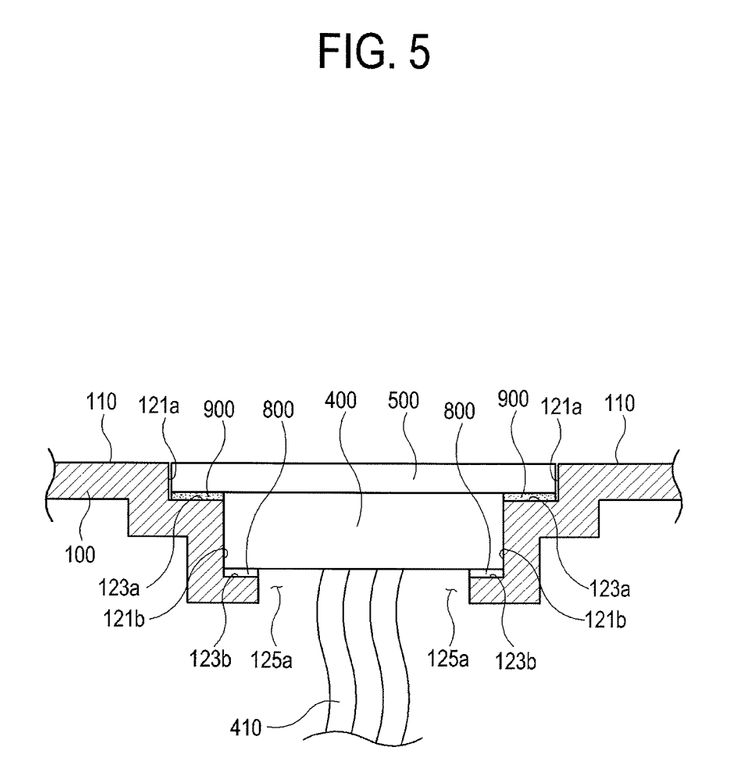
FIG. 5 is an assembled sectional view illustrating a touch-pad in the portable computer of FIG. 4.

The lower edge area of the cover pad 500 couples to the first seating portion 123a by the second coupling member 900, while the lower central area of cover pad 500 contacts the upper plate surface of the touch-pad 400. The touch-pad 400 and the cover pad 500 contacts the second supporting portion 120b and the first supporting portion 120a, respectively. Thus, a separate coupling member (not illustrated) is not needed between the cover pad 500 and the touch-pad 400. However, the separate coupling member (not illustrated) may further be provided to couple the cover pad 500 and the touch-pad 400 so that the cover pad 500 and the touch-pad 400 are coupled therebetween to enhance a sensing capability of the touch-pad 400.

With this configuration, in the portable computer 1 according to the exemplary embodiment of the present general inventive concept as illustrated in FIG. 4, the process coupling the touch-pad 400 and the cover pad 500 to the main body casing 100 will be described with reference to FIGS. 4 and 5.

If the main body casing 100 sits on the predetermined installation surface, the upper plate 110, the first supporting portion 120a, and the second supporting portion 120b open upwardly. The first coupling member 800 adheres to the second seating portion 123b.

With the lower plate surface to which the connecting member 410 is connected facing downwardly, the touch-pad 400 is mounted on the second seating portion 123b. At that time, the connecting member 410 passes through the opening 125a and extends to the inside of the main body casing 100, thereby connecting to a predetermined device such as a main board portion (not illustrated), etc. The touch-pad 400 mounted on the second seating portion 123b adheres to the second seating portion 123b by the first coupling member 800.

The second coupling member 900 adheres to the first seating portion 123a, and then the cover pad 500 is mounted on the first seating portion 123a. The cover pad 500 adheres to the first seating portion 123a by the second coupling member 900 and the bottom plate surface of the cover pad 500 contacts the upper plate surface of the touch-pad 400.

For example, if a liquid is spilled on the upper plate 110, although the liquid may permeate between the first lateral wall 121a and the cover pad 500, the second coupling member 900 prevents the liquid from arriving to the touch-pad 400, an improves airtightness of the touch-pad 400 to protect the touch-pad 400.

Also, when the touch-pad 400 is separated from the main body casing 100 to be replaced, the coupling areas between the cover pad 500 and the first seating portion 123a, and between the touch-pad 400 and the second seating portion 123b are small, thereby allowing the touch-pad 400 to separate from the main body casing 100 without difficulty. Also, a separate coupling member (not illustrated) is not interposed between the cover pad 500 and the touch-pad 400 so that the cover pad 500 and the touch-pad 400 can be separated without difficulty and be replaced individually.

As described above, various embodiments of the present general inventive concept provides a portable computer to simplify the coupling configuration of the touch-pad of the main body casing, thereby reducing the cost and enhancing productivity.

Also, various embodiments of the portable computer has a touch-pad which is easily separated and replaced from the portable computer, thereby increasing a degree of utilization of resources and facilitating factory work.

Also, the airtightness of the device from the outside is increased, thereby improving reliability of the device.

Also, various embodiments of the portable computer include the cover pad which is separately detachably coupled to the main body casing to provide an elegant external appearance for the portable computer.

Although various embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A portable computer, comprising:
a main body casing comprising an upper plate and a supporting portion disposed below the upper plate, the supporting portion comprising a lateral wall bent from the upper plate, and a seating portion bent from the lateral wall to form a first opening through the main body casing;
a touch pad, supported by the supporting portion, having a first bottom surface facing the seating portion and a second bottom surface facing the first opening; and
a first coupling member, disposed between the seating portion and the first bottom surface, in which a second opening is formed to enable the second bottom surface to be accessed through the first opening,
wherein the first coupling member has a predetermined adhesive strength with respect to the seating portion so that the touch-pad is detachably coupled to the supporting portion, the predetermined adhesive strength enabling replacement of the touch-pad separate from the main body casing.

2. The portable computer according to claim 1, further comprising:
a cover pad received by the supporting portion, to cover the touch-pad.

3. The portable computer according to claim 2, wherein the cover pad comprises:
an insulating material.

4. The portable computer according to claim 2, further comprising:
a second coupling member having two sides, each side having the same front-and-back and left-and-right widths as those of the touch-pad and the cover pad, to couple the touch-pad and the cover pad by coupling one side of the second coupling member entirely to an upper surface of the touch-pad and coupling a lower surface of the cover pad entirely to the other side of the second coupling member.

5. The portable computer according to claim 4, wherein the second coupling member comprises:
a double-sided adhesive tape.

6. The portable computer according to claim 2, wherein the supporting portion further comprises a first supporting portion formed below the upper plate to support the cover pad, the first supporting portion comprising:
a first lateral wall bent from the upper plate, and
a first seating portion bent from the first lateral wall to form a recessed area to receive the touch-pad.

7. The portable computer according to claim 6, wherein the supporting portion further comprises a second supporting portion formed below the first supporting portion to support the touch-pad, the second supporting portion comprising:
a second lateral wall bent from the first seating portion, and
a second seating portion bent from the second lateral wall to form the first opening.

8. The portable computer according to claim 7, wherein the first coupling member is disposed between the second seating portion and the first bottom surface of the touch-pad, and the first opening formed by the second seating portion coincides in shape and size with the second opening of the first coupling member.

9. The portable computer according to claim 6, wherein the cover pad is supported by the first seating portion and has a first bottom surface facing the first seating portion and a second bottom surface contacting the touch-pad.

10. The portable computer according to claim 9, further comprising:
a second coupling member, disposed between the first seating portion and the first bottom surface of the cover pad, in which a third opening is formed to receive the touch-pad,
wherein the second bottom surface of the cover pad coincides in shape and size with the third opening of the second coupling member.

11. The portable computer according to claim 10, wherein the recessed area formed by the first seating portion has an upper end coinciding in shape and size with the third opening of the second coupling member.

12. The portable computer according to claim 10, further comprising:
a connecting member to transmit pointer position data generated in the touch-pad, the connecting member passing through the first and second openings and connecting to the touch-pad, the third opening enabling the touch-pad to be removed from the recessed area while connected to the connecting member.

13. The portable computer according to claim 6, wherein the second coupling member has a predetermined adhesive strength with respect to the first seating portion that enables the detachable coupling of the touch-pad to the supporting portion.

14. The portable computer according to claim 13, wherein the first seating portion has an inner portion forming a smaller rectangle, the first lateral wall forms a larger rectangle, the smaller and larger rectangles have a same shape and differ in size by a width of the first seating portion, and the adhesive strength of the second coupling member is determined by the width of the first seating portion.

15. The portable computer according to claim 1, wherein the first coupling member comprises:
a double-sided adhesive tape.

16. The portable computer according to claim 1, further comprising:
a connecting member to transmit pointer position data generated in the touch-pad, the connecting member passing through the first and second openings and connecting to the touch-pad.

17. The portable computer according to claim 1, wherein the predetermined adhesive strength of the first coupling member is determined by a width of the seating portion.

18. The portable computer according to claim 1, wherein the lateral wall forms a larger rectangle, the seating portion has an inner portion forming a smaller rectangle centered within the larger rectangle, and the smaller and larger rectangles have a same shape and differ in size by a width of the seating portion.

19. The portable computer according to claim 18, wherein the predetermined adhesive strength of the first coupling member is adjusted by reducing the width of the seating portion.

20. A method of coupling a touch-pad assembly to a main body casing of a portable computer, the method comprising:
coupling one side of a first coupling member to a touch-pad seating portion forming a first opening through the main body casing, the touch-pad seating portion disposed below an upper plate of the main body casing to receive a touch-pad; and
coupling one side of the touch-pad to the other side of the first coupling member, by arranging a first bottom surface of the touch-pad to face the touch-pad seating portion and arranging a second bottom surface of the touch-pad to face the first opening,
wherein the first coupling member is disposed between the touch-pad seating portion and the first bottom surface and has a predetermined adhesive strength with respect to the touch-pad seating portion so that the touch-pad is detachably coupled to the touch-pad seating portion, the predetermined adhesive strength enabling replacement of the touch-pad separate from the main body casing, and a second opening is formed in the first coupling member to enable the second bottom surface to be accessed through the first opening.

21. The method according to claim 20, further comprising:
passing a connecting member through the first and second openings; and
connecting the connecting member to the second bottom surface of the touch-pad.

22. The method according to claim 20, further comprising:
coupling one side of a second coupling member entirely to the other side of the touch-pad; and
coupling one side of a cover pad entirely to the other side of the second coupling member;
wherein each side of the second coupling member has the same front-and-back and left-and-right widths as those of the touch-pad and the cover pad.

23. The method according to claim 20, further comprising:
coupling one side of a second coupling member to a cover pad seating portion for supporting a cover pad having a first bottom surface facing the first seating portion and a second bottom surface contacting the other side of the touch-pad; and
coupling one side of the cover pad to the other side of the second coupling member,
wherein the second coupling member is disposed between the cover pad seating portion and the first bottom surface of the cover pad, and a third opening is formed in the second coupling member to receive the touch-pad.

24. The method according to claim 23, further comprising:
passing a connecting member through the first and second openings; and
connecting the connecting member to the second bottom surface of the touch-pad,
wherein the third opening enables the touch-pad to be removed from the touch-pad seating portion while connected to the connecting member.

25. A portable computer, comprising:
a main body casing comprising an upper plate and a supporting portion disposed below the upper plate, the supporting portion comprising a lateral wall bent from the upper plate, and a seating portion bent from the lateral wall to form a first opening through the supporting portion;
a touch-pad, supported by the supporting portion, having a first bottom surface facing the seating portion and a second bottom surface facing the first opening; and
a first coupling member, disposed between the seating portion and the first bottom surface, in which a second opening is formed to enable a connecting member to pass through the first and second openings and connect to the second bottom surface of the touch-pad,
wherein the first coupling member has a predetermined adhesive strength with respect to the seating portion so that the touch-pad is detachably coupled to the supporting portion, the predetermined adhesive strength enabling replacement of the touch-pad separate from the main body casing.

* * * * *